United States Patent Office 3,501,438
Patented Mar. 17, 1970

3,501,438
PROCESS FOR THE PRODUCTION OF THERMO-
STABLE TRIOXANE COPOLYMERS IN FORM OF
PARTICLES OF REGULAR SIZE
Stanislaw Penczek, Sady Zoliborskie 9m3; Jerzy Fejgin,
Al. Wyzwolenia 9m157; Maria Tomaszewicz, Wiejska
9m157; and Wanda Sadowska, Kubanska 8m13, all of
Warsaw, Poland
No Drawing. Filed May 8, 1967, Ser. No. 636,635
Claims priority, application Poland, May 13, 1966,
P 114,555
Int. Cl. C08g 1/04
U.S. Cl. 260—67                               3 Claims

ABSTRACT OF THE DISCLOSURE

A process in which trioxane is copolymerized in a solvent suspension together with dioxolane in the presence of 0.01 to 20% by weight of a non-ionic surface-active agent.

This invention relates to a process for the production of thermostable trioxane copolymer in the form of particles of regular size.

There are known methods of producing thermostable trioxane copolymers by copolymerization with heterocyclic compounds, of which cyclic acetals and cyclic ethers are the most frequently used. The main difficulty in carrying out the industrial process is the necessity of using concentrated solutions of more than 50% by weight of trioxane in order to obtain a copolymer of sufficiently high molecular weight required for industrial purposes. However the said concentrated solutions become lumped and immiscible in the end-stage of the polymerization. In this connection, in the known processes, special kneader type devices are used for polymerization. Namely, in U.S. Patent No. 3,174,984, GFR Patent 1,136,109, Belgium Patent No. 625,056 or Belgium patent application No. 621,683, the process is carried to a low conversion of monomer, since an excess of unpolymerized trioxane facilitates the mixing of the reaction mass. (Netherlands patent application No. 29,921.)

However even under the above conditions, serious difficulties are encountered, such as those in the removal of the reaction mass from the reactor vessel as well as with the deposition of solid product on the walls and parts of operating devices and apparatus. In addition, further crushing of the end product is necessary. As the resulting polymer is lumped, the polymer particles in the known processes after crushing are of relatively large size (average size $50\mu$) and have a considerably developed surface, which facilitates the adsorption of catalyst.

The catalyst involved in the particles of the copolymer causes a decrease in the molecular weight resulting from the secondary degradation which continues until the catalyst is entirely removed from the particles or neutralized into them. The process involving the occurrence of irregular particles is also characterized by the fact that the use of a small amount of catalyst, enables the controlled conducting of polymerization but on the other hand results in low conversion of comonomers in connection with the physical immobilization of catalyst molecules into the particles of precipitated and agglomerated polymer deposit. In the course of research concerned with the problem of modification it has been found that polymers obtained in the presence of certain compounds such as surface active substances, have a quite different physical form than products obtained by known methods. Microscopic examination has shown that the particles of these polymers are of a regular, spherical size and of very small size (e.g., average $9\mu$).

It was also found that the reaction mixture even at a high degree of conversion is free flowing, and neither lumped nor caked as in the previous processes which are conducted without the use of the aforesaid substances. Further examination of the copolymerization process performed in the presence of surface active agents, has shown that the particles of polymer are not agglomerated and the polymer does not undergo the secondary degradation in effect of a catalyst action. The best proof of these differences has been shown by a comparison of the dependence of molecular weight and yield of the polymer on the time of polymerization. In the polymerization performed in the presence of a surface active agent, the conversion of monomers reaches 90–92% and from a certain yield degree, which is characteristic of these process conditions, the molecular weight remained unchanged till the completion of the process. On the contrary, in the polymerization performed without the use of a modifying surface active agent, the molecular weight reaches its maximum relatively quickly, and the latter then gradually decreases and the process yield does not exceed 75%. However, even at such relatively low yields, the use of these monomer concentrations, necessary for obtaining the molecular weight required for industrial purposes, eliminates the possibility of mixing in common reactor vessels.

According to the invention, surface active agents are used in the cationic copolymerization of trioxane providing a reduced and uniform particle size polymer. Moreover the said agents cause a diminution of the irregularity of particle surface as well as the elimination of the secondary degradation of the formed polymer, which is the result of catalyst action in the final polymerization stage, and results in a considerable process yield. The common cause of all these effects is the formation of a protective layer of the surface active agent on the surface of the precipitating particles. This protective layer prevents absorbing of the catalyst and solvent molecules by polymer particles as well as the agglomeration of the previously precipitated particles. As stated above, microscopic examination of the particle surface reveals a more uniform and smooth surface, and the size of the particles is so small that the entire system has an emulsion-like quality. As a result of said emulsion-like quality, mixing of the reaction mixture is possible even in the case where the polymer content reaches 65% by weight, corresponding to a 90% conversion at the optimal concentration of comonomer.

An additional advantage resulting from the method according to this invention is a decrease in the amount of the unstable fraction, which must be removed from the copolymer by a special treatment before further processing. The formation of the protective layer of surface active agent on the surface of the particles which are precipitated during the copolymerization prevents the above-mentioned degradation as stated above. During this degradation, unstable chain end groups are generally formed, which are a source of formaldehyde which is thereafter evolved from the copolymer during the processing. According to the invention, saturated polyesters, polyvinyl acetals, preferably polyvinylformal, polyvinylethanol and polyvinylbutyral, containing less than 5% by weight of hydroxyl groups, alkylene polyethers, preferably linear and branched polyethylene oxides and polypropylene oxides having blocking and non-blocking terminal groups, of a molecular weight from 1,000 to 100,000 and condensation products of acids, alcohols, and phenols with organic oxides, preferably the condensation products of nonyl phenol and octyl phenol with ethylene oxide, containing from 10 to 90 hydroxy-ethylene groups are introduced into the trioxane cationic polymerization or copolymerization medium as non-ionic surface active agents (moderators).

According to the invention the amount of non-ionic surface active agents introduced is from 0.01–20% by weight in relation to the amount of trioxane. The preferred amount is from 0.5 to 5% of said agents.

Table I illustrates the advantages of the process according to the invention in comparison with known processes for the production of trioxane copolymers without the use of surface active agents and the following examples describe the process of the invention.

and the total yield was 81.1%. Subsequently the obtained polymer was stabilized with a composition of antioxidants comprising 0.5 g. of 2,2-methylene-bis(4-methyl-6-tert. butylphenol) and 2.0 g. of mixed copolyamide NG (50% of polycaprolactam+50% of polyhexamethylenedipamide).

The thermostability test of the copolymer, measured as a loss of a sample mass, having a weight of 100 mg., heated in air at a temperature of 232° C. for 30 minutes resulted in a $K_{232}$ of 0.03% min.$^{-1}$. The inherent viscosity $\eta$ determined at a temperature of 100° C. in a mixture comprising tetrachloroethane and phenol (3:1) with the addition of 2%-pinene was 1.15 dl. g.$^{-1}$.

TABLE I

| Comonomers | Catalyst, $BF_3.O(C_2H_5)_2$ molar ratio of catalyst to comonomer | Moderator Kind | Quantity molar percentage to trioxane ratio | Copolymerization time, min. | Copolymerization yield, percent | Quantity of unstable fraction, percent | Total yield, percent | $K_{232}$, percent/min. | [$\eta$] | Remarks |
|---|---|---|---|---|---|---|---|---|---|---|
| TOK 6.17 mole/kg., DO 0.31 mole/kg. | $2.87 \times 10^{-2}$ | | | 150 | 67.0 | 15.7 | 51.3 | 0.09 | 1.10 | Mixing up over whole process period. |
| TOK 6.17 mole/kg., DO 0.31 mole/kg. | $4.2 \times 10^{-2}$ | | | 30 | 68.5 | 16.2 | 52.3 | 0.06 | 1.23 | Violent-reaction course, lumping after 12 min. |
| TOK 6.50 mole/kg., DO 0.35 mole/kg. | $4.18 \times 10^{-2}$ | | | 90 | 74.3 | 18.3 | 56.0 | 0.09 | 0.90 | Violent-reaction course, lumping after 10 min. molecular weight too low. |
| TOK 7.5 mole/kg., DO 0.375 mole/kg. | $5.4 \times 10^{-2}$ | $C_9H_{17}.C_6H_4(OCH_2CH_2)_{30}OH$ | 0.77 | 30 | 92 | 10.9 | 81.1 | 0.03 | 1.15 | Mixing up over a whole process period. |
| TOK 7.5 m./kg., DO 0.375 m./kg. | $5.5 \times 10^{-2}$ | Polypropylene oxide (molecular weight=2200). | 0.77 | 45 | 84.2 | 11.0 | 73.2 | 0.03 | 1.12 | Do. |
| TOK 7.5 mole/kg., DO 0.375 m./kg. | $6.0 \times 10^{-2}$ | Polyethylene oxide (molecular weight=15,000). | 1.0 | 30 | 80.7 | 7.3 | 73.4 | 0.03 | 1.29 | Do. |
| TOK 7.5 m./kg., DO 0.375 m./kg. | $6.0 \times 10^{-2}$ | Polyethylene oxide (molecular weight=15,000). | 1.5 | 60 | 79.0 | 5.0 | 74.0 | 0.03 | 1.35 | Do. |

TOK=trioxane, DO=dioxolane.

EXAMPLE I 50 g. of anhydrous cyclohexane, 112.5 g. (1.25 mole) of melted, freshly distilled trioxane (water content of trioxane 200 p.p.m.), 4.5 g. (0.061 mole) of freshly distilled dioxolane and 0.77 g. hydroxyethylated nonyl phenol $C_9H_{17} \cdot C_6H_4(OCH_2CH_2)_{30}OH$ were successively introduced into a 5-neck flask, of a volume=1 liter and provided with an agitator, a reflux condenser, a thermometer and having an inlet for an inert gas. The mixture was heated to 60° C. with continuous agitation, in a stream of anhydrous nitrogen and 0.0957 g. ($5.4 \times 10^{-2}$ molar percent in relation to comonomer) of $BF_3 \cdot O(C_2H_5)_2$ complex was added.

Copolymerization was carried out for 30 minutes at a temperature in the range of 60–72° C., with continuous agitation. Subsequently, the process was terminated by the addition of 100 ml. of 51% solution of ammonia in methanol. The copolymer was filtered, washed with boiling water and subsequently with 200 ml. of methanol. The product was dried to a constant weight at 80° C. (12 hours) and 107.6 g. of a white finely dispersed powder were obtained (yield: 92%). The dry copolymer was heated for 30 minutes, at a temperature of 150° C. in 1000 ml. of benzyl alcohol containing 20 ml. of tri-n-butylamine. Under these conditions, complete dissolution of the product occurs. After cooling to 120° C., the copolymer was precipitated from the solution.

Then the mixture was still further cooled to 60° C. and at this temperature 500 ml. of methanol were added. After filtering, multiple washing with methanol and drying to a constant weight at 80° C., 95 g. of copolymer were obtained. The content of the unstable fraction was 10.9%

EXAMPLE II

The process was similar to Example I, except that instead of 0.77 g. of hydroxyethylated nonyl phenol, 1.17 g. of polyvinyl butyral were used. The consistency of the reaction mixture enables the efficacious mixing during the total copolymerization process. 98 g. of the fine grained copolymer were obtained at a yield of 83.8%.

The inherent viscosity was 1.03 and the content of the unstable fraction was 12.7%. The $K_{232}$ value was equal to 0.06% min.$^{-1}$ (after the additional stabilization according to Example I).

EXAMPLE III

The process was similar to Example I except that instead of 0.77 g. of hydroxyethylated nonyl phenol, 1.50 g. of Antarox Co. 990 (a non-ionic surface active agent of an unknown structure produced by General Aniline and Film Corporation) were used.

101 g. of the copolymer thusly obtained had an inherent viscosity of 1.20. The content of the unstable fraction in the copolymer was 5.3%. The $K_{232}$ value was equal to 0.03% min.$^{-1}$.

What we claim is:

1. A process for the production of a thermostable polyacetal which comprises copolymerizing trioxane in a solvent suspension together with dioxolane in the presence of a non-ionic surface-active agent selected from the group consisting of the condensation products of acid, alcohols and phenols with alkylene oxides, said surface-active agent being present in an amount corresponding to 0.01 to 20% by weight based on trioxane to form uniform size particles of a thermostable polyacetal.

2. The process as claimed in claim 1 wherein the alkylene oxide is ethylene oxide or propylene oxide.

3. The process as claimed in claim 1 wherein the nonionic surface-active agent is a condensation product of a phenol selected from the group consisting of nonyl phenol and octyl phenol and ethylene oxide, said condensation product containing 10 to 90 hydroxyethylene groups and being present in an amount corresponding to 0.5 to 5% by weight based on trioxane.

References Cited

UNITED STATES PATENTS

| | | | |
|---|---|---|---|
| 3,294,750 | 12/1966 | Baccaredda et al. | 260—67 |
| 3,367,916 | 2/1968 | Vonder Emden et al. | 260—67 |
| 3,346,663 | 10/1967 | Kern et al. | |

WILLIAM H. SHORT, Primary Examiner

L. M. PHYNES, Assistant Examiner

U.S. Cl. X.R.

260—73